March 2, 1948.   E. E. McKEIGE   2,437,111
CABLE CLAMP
Filed Dec. 6, 1944
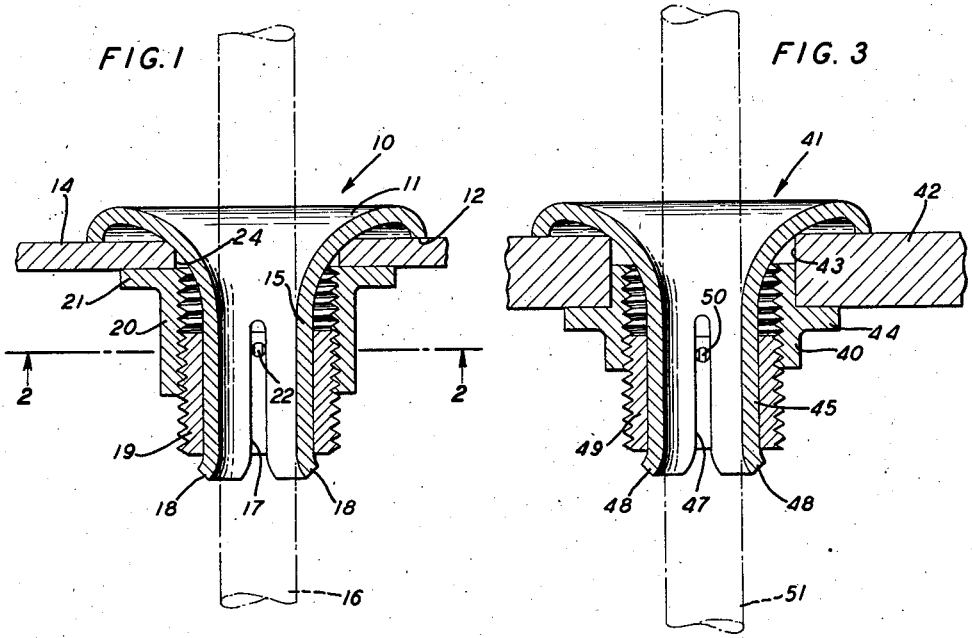
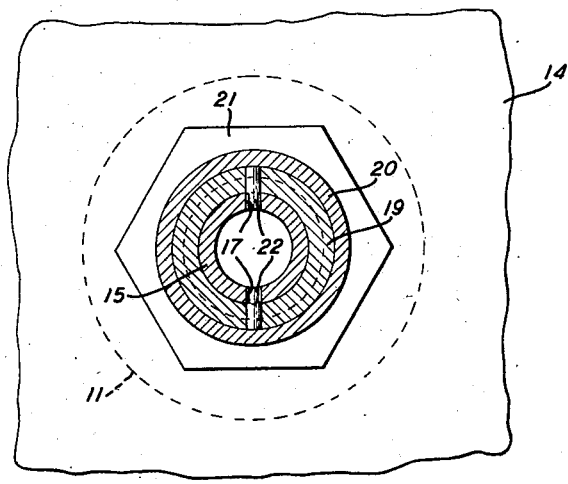
INVENTOR
E. E. McKEIGE
ATTORNEY Patented Mar. 2, 1948

2,437,111

UNITED STATES PATENT OFFICE 2,437,111

CABLE CLAMP

Edward E. McKeige, Cranford, N. J., assignor to Western Electric Company, Incorporated, New York, N. Y., a corporation of New York Application December 6, 1944, Serial No. 566,925

8 Claims. (Cl. 24—115)

This invention relates to cable clamps, and more particularly to clamps for securing cables in panels or the like.

The life of a flexible cable or conductor cord, extending through a panel or casing of an electrical unit for supplying electrical energy thereto, may be lengthened and its connections with the parts thereof assured by providing a clamp, capable of holding the cable or cord against longitudinal movement at the position where it passes through the panel or casing, and providing curved surfaces to eliminate wear upon the cable or cord.

An object of the invention is to provide a clamp which is simple in construction, and highly efficient in positively clamping a cable or cord in an aperture of a panel or casing.

With this and other objects in view, the invention comprises a cable clamp having a hollow body receivable in an aperture of a panel or casing and having also longitudinal slots therein to provide resilient portions, and relatively movable threadedly connected elements positioned to respectively engage the panel or casing and the resilient portions of the body to clamp the body to the panel or casing and force the resilient portions into clamping engagement with cable extending through the hollow body.

Other objects and advantages will be apparent from the following detailed description when considered in conjunction with the accompanying drawing, wherein Fig. 1 is a longitudinal sectional view of one species of the invention;

Fig. 2 is a sectional view taken along the line 2—2 of Fig. 1; and

Fig. 3 is a longitudinal sectional view of another species of the invention.

Referring now to the drawing, attention is first directed to Figs. 1 and 2 where a hollow body, indicated generally at 10, is formed of a suitable material, preferably metal belled outwardly at 11 with the outer portions curving inwardly to an annular surface 12, positioned to engage the outer surface of a support or casing 14. The central portion of the body is tubular, this portion being indicated at 15, and adapted to receive a cable 16. The term "cable" is intended to apply to any flexible unit including one or more electrical conductors. Diametrically opposed slots 17 are formed in the portion 15 of the body 10 to provide resilient members which may be moved toward each other to clamp the cable against longitudinal movement. The lower portions of the resilient members are flared outwardly at 18 to be engaged by a threaded element 19 to function in the clamping of the cable. Another threaded element 20 with internal threads interengaging the external threads of the element 19 is disposed upon the latter and provided with a flange 21 positioned to engage the inner surface of the casing 14. Diametrically opposed pins 22 are carried by the threaded element 19 and extend into the slots 17 to hold the element 19 against rotation, yet permit movement thereof axially of the tubular portion 15 of the body 10.

With this structure, it will be apparent that the threaded elements 19 and 20 may, in their interconnected positions, be mounted upon the portion 15 of the body, after the latter has been moved through an aperture 24 in the casing 14. The assembling of the elements 19 and 20 may take place by forcing the resilient portions of the body toward each other. It will be noted that the lower ends of the slots 17 are tapered outwardly to permit entrance of the pins 22 into their slots during the assembling of the elements on the body. It should be understood that in actual structure, the walls of the body 10 will be considerably thinner than that shown in the drawing, the thickness of the material of the body having been increased for the purpose of clearness. When the elements 19 and 20 have been assembled upon the portion 15 of the body with the pins 22 positioned in the slots 17, rotary movement of the element 20 in a clockwise direction (Fig. 2) will cause relative movement of the elements to move the element 20 into intimate engagement with the inner surface of the casing 14 and at the same time force the element 19 into engagement with the outwardly flared portions 18 to force the resilient portions of the body inwardly, clamping the cable against longitudinal movement. The holding force on the cable, as well as the holding force between the portion 11 or the edges 12 thereof, and the flange 21 may be varied depending upon the relative movement of the elements 19 and 20.

Attention is directed to the contour of the flange 21 in Fig. 2 where it is illustrated as having a hexagonal contour to receive a wrench for use in bringing about the rotation of the element 20 relative to the element 19 and the body 10.

The species of the invention shown in Fig. 3 is very similar to a structure shown in Figs. 1 and 2, the only variation being in the contour of the element 40 over the contour of the element 20 to provide for the connection of the body, indicated generally at 41, with a support or panel 42. The aperture 43 of the panel is of greater depth than the aperture 24 of the casing 14, and for this reason the flange 44 is positioned below the upper edge of the element 40 so that a portion of the latter may project into the aperture of the panel. The central portion 45 of the body has diametrically opposed slots 47 and outwardly flared ends 48 to be engaged by a threaded element 49. Pins 50 carried by the element 49 are receivable in the diametrically opposed slots 47, only one pin and slot being shown in the drawing.

The assembling and clamping operations for this species of the invention are substantially identical to those of the species shown in Figs. 1 and 2. In other words, the interconnected elements 40 and 49 may be disposed upon the tubular portion 45 of the body 41 after the latter has been placed in the aperture 43 of the panel 42 by forcing the resilient portions of the body toward each other so that the outwardly flared portions 48 may be received in the element 49. After the elements have been assembled on the body, rotation of the element 40, through the aid of a wrench or other suitable means applied to the flange 44, which may also be hexagonal in general contour, will move the element 40 into clamping engagement with the inner surface of the panel 42 while at the same time, the element 49 will move the outwardly flared portion of the body into intimate engagement with the outer surface of the panel and move the resilient portions of the body into the clamping engagement with the cable indicated at 51.

Although it was not mentioned, regarding the structure shown in Figs. 1 and 2, it is apparent that the force of the element 19 on the outwardly flared portions 18 will move the surface 12 into intimate engagement with the outer surface of the casing 14. Through either structure, three things are accomplished through the single rotation of either element 20 or 40 and all three are accomplished simultaneously, they being the forcing of the flange of each of the outer elements 20 and 40 into intimate engagement with the casing or panel, the movement of the outwardly flared body portions into intimate engagement with the outer surface of the casing or panel through the movement of the threaded elements 19 and 49 into engagement with the outwardly flared portions 18 and 48 respectively, this action causing also inward movement of the resilient portions of the body in each instance to clamp their respective cables, the clamping forces on the cables and the inner and outer surfaces of the casing or panel being simultaneously varied with variations in the relative movements of the threaded elements.

It has been described that the threaded elements in each species may be forced over the flared ends 18 and 48, of their respective bodies by compressing the resilient portions toward each other. Actually, during the manufacture of the cable clamp, the elements 19 and 49 are to be placed on their respective bodies prior to the forming of the flared ends 18 and 48.

Although specific improvements of the invention have been shown and described, it will be understood that they are but illustrative and that various modifications may be made therein without departing from the scope and spirit of this invention as defined by the appended claims.

What is claimed is:

1. A cable clamp comprising a hollow body for receiving a cable extending longitudinally therethrough, the body being receivable in an aperture of a support and having outwardly projecting ends, and operatively connected elements disposed upon the body and relatively movable to respectively engage the support and one of the outwardly projecting ends to cause clamping of the support adjacent the aperture between the other outwardly projecting end and the adjacent element.

2. A cable clamp comprising a hollow body for receiving a cable extending longitudinally therethrough, the body being receivable in an aperture of a support and having outwardly projecting ends, one of which is longitudinally slotted to form resilient portions, and operatively connected elements disposed upon the body and movable relative to each other to respectively engage the support and the slotted end to cause the resilient portions to clamp the cable and cause clamping of the support adjacent the aperture between the other outwardly projecting end and the adjacent element.

3. A cable clamp comprising a hollow body for receiving a cable extending longitudinally therethrough, the body being receivable in an aperture of a support and having outwardly projecting ends, one of which is longitudinally slotted to form resilient portions, and operatively connected elements disposed upon the body and movable relative to each other to respectively engage the support and the slotted end to cause the resilient portions to clamp the cable and cause clamping of the support adjacent the aperture between the other outwardly projecting end and the adjacent element, and means to hold one of the elements against rotation on the body.

4. A cable clamp comprising a hollow body for receiving a cable extending longitudinally therethrough, the body being receivable in an aperture of a support and having outwardly projecting ends, one of which is longitudinally slotted to form resilient portions, and threadedly connected elements disposed on the body and movable relative to each other to respectively engage the support and the slotted end to cause the resilient portions to move inwardly to clamp the cable and cause clamping of the support adjacent the aperture between the other end of the body and the adjacent element, and means to hold one of the threaded elements against rotation, but for free axial movement on the body.

5. A cable clamp comprising a hollow body for receiving a cable extending longitudinally therethrough, the body being receivable in an aperture of a support and having outwardly projecting ends, one of which is longitudinally slotted to form resilient portions, and threadedly connected elements disposed on the body and movable relative to each other to respectively engage the support and the slotted end to cause the resilient portions to move inwardly to clamp the cable and cause clamping of the support adjacent the aperture between the other end of the body and the adjacent element, and a member carried by one of the threaded elements and movable in the slot to cooperate with the walls of the slot to hold the said element against rotation, but for axial movement on the body.

6. A cable clamp comprising a hollow body for receiving a cable extending longitudinally therethrough, the body being receivable in an aperture of a support and having one end substantially bell-shaped, the other end being slotted to form resilient portions and also being flared outwardly, and threadedly connected elements disposed on the body for relative rotation of the elements to cause axial movement thereof in opposite directions to respectively engage the support and the outwardly flared end and the support to move the bell-shaped end into intimate engagement with the opposite side of the support and cause one of the elements to move the resilient portions inwardly to clamp the cable.

7. A cable clamp comprising a hollow body for receiving a cable extending longitudinally therethrough, the body being receivable in an aperture of a support and having one end substantially bell-shaped, the other end being slotted to form resilient portions and also being flared outwardly, and threadedly connected elements disposed on the body for relative rotation of the elements to cause axial movement thereof in opposite directions to respectively engage the support and the outwardly flared end and the support to move the bell-shaped end into intimate engagement with the opposite side of the support and cause one of the elements to move the resilient portions inwardly to clamp the cable, and means to hold one of the threaded elements against rotation, but for free axial movement on the body.

8. A cable clamp comprising a hollow body for receiving a cable extending longitudinally therethrough, the body being receivable in an aperture of a support and having one end substantially bell-shaped, the other end being slotted to form resilient portions and also being flared outwardly, and threadedly connected elements disposed on the body for relative rotation of the elements to cause axial movement thereof in opposite directions to respectively engage the support and the outwardly flared end and the support to move the bell-shaped end into intimate engagement with the opposite side of the support and cause one of the elements to move the resilient portions inwardly to clamp the cable, and a member carried by one of the threaded elements and movable in the slot to cooperate with the walls of the slot to hold the said element against rotation, but for axial movement on the body.

EDWARD E. McKEIGE.

REFERENCES CITED

The following references are of record in the file of this patent:

UNITED STATES PATENTS

| Number | Name | Date |
|---|---|---|
| 947,185 | McBean | Jan. 18, 1910 |
| 1,365,357 | Twiss | Jan. 11, 1921 |
| 1,426,337 | Sperry | Aug. 15, 1922 |
| 1,488,175 | Strandell | Mar. 25, 1924 |
| 1,491,873 | McMurtrie | Apr. 29, 1924 |
| 1,736,888 | Selah | Nov. 26, 1929 |

FOREIGN PATENTS

| Number | Country | Date |
|---|---|---|
| 445,864 | Great Britain | Apr. 15, 1936 |